(12) United States Patent
Wu et al.

(10) Patent No.: US 7,894,482 B1
(45) Date of Patent: Feb. 22, 2011

(54) METHOD AND DEVICE FOR MAPPING AND DEMAPPING A CLIENT SIGNAL

(75) Inventors: Qiuyou Wu, Shenzhen (CN); Yao Shen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 12/941,472

(22) Filed: Nov. 8, 2010

Related U.S. Application Data (63) Continuation of application No. PCT/CN2010/070171, filed on Jan. 14, 2010.

(30) Foreign Application Priority Data

Feb. 10, 2009 (CN) .................. 2009 1 0005200

(51) Int. Cl.
*H04J 3/00* (2006.01)
(52) U.S. Cl. ...................... 370/476; 370/907
(58) Field of Classification Search .................. 370/389, 370/394, 395.5, 395.51, 465, 470–476, 503–505, 370/907
See application file for complete search history.

(56) References Cited

U.S. PATENT DOCUMENTS

| | | | | |
|---|---|---|---|---|
| 7,286,487 B2 * | 10/2007 | Perkins et al. | ............... | 370/253 |
| 7,583,697 B2 * | 9/2009 | Zou | ............................ | 370/466 |
| 7,602,814 B2 * | 10/2009 | Meagher et al. | ............. | 370/505 |
| 7,809,017 B2 * | 10/2010 | Harley et al. | ................. | 370/474 |
| 2008/0075113 A1 | 3/2008 | Harley et al. | | |
| 2010/0067905 A1 | 3/2010 | Dong et al. | | |
| 2010/0221005 A1 | 9/2010 | Zhao | | |

FOREIGN PATENT DOCUMENTS

| | | |
|---|---|---|
| CN | 101030827 A | 9/2007 |
| CN | 101155016 A | 4/2008 |
| CN | 101291179 A | 10/2008 |

(Continued)

OTHER PUBLICATIONS

Foreign communication from a counterpart application, PCT application PCT/CN2010/070171, English Translation International Search Report and Written Opinion dated Apr. 22, 2010, 7 pages.

(Continued)

*Primary Examiner*—Frank Duong
(74) *Attorney, Agent, or Firm*—Conley Rose, P.C.; Grant Rodolph (57) ABSTRACT

A method and a device for mapping and demapping a client signal are provided. The method for mapping a client signal includes: dividing a part or all of a payload area of an Optical Channel Payload Unit (OPU) or Optical channel Data Tributary Unit (ODTU) into several sub-blocks, in which the sub-blocks have a size of N bytes, and N is greater than or equal to 1; and mapping a client signal to be transported to the sub-blocks of the payload area with an N-byte granularity. In the technical solutions, when the client signal is mapped, block mapping of the client signal is performed by using a mapping granularity of a block, so that the complexity of the mapping process of the client signal can be reduced, thereby meeting requirements of multi-rate services.

16 Claims, 8 Drawing Sheets

FOREIGN PATENT DOCUMENTS

| | | | |
|---|---|---|---|
| CN | 200910005200.5 | * | 2/2009 |
| EP | 2148476 A1 | | 1/2010 |

OTHER PUBLICATIONS

"Interfaces for the Optical Transport (OTN)," ITU-T Series G: Transmission Systems and Media, Digital Systems and Networks—Digital Terminal Equipments—General—Series Y: Global Information Infrastructure, Internet Protocol Aspects and Next Generation Networks—Internet Protocol Aspects—Transport, ITU-T G.709/Y.1331, Mar. 2003.

"Interfaces for the Optical Transport (OTN)," ITU-T Series G: Transmission Systems and Media, Digital Systems and Networks—Digital Terminal Equipments—General—Series Y: Global Information Infrastructure, Internet Protocol Aspects and Next Generation Networks—Internet Protocol Aspects—Transport, ITU-T G.709/Y.1331, Amendment 2, Nov. 2007.

* cited by examiner

METHOD AND DEVICE FOR MAPPING AND DEMAPPING A CLIENT SIGNAL

CROSS-REFERENCE TO RELATED APPLICATIONS

This application is a continuation of International Application No. PCT/CN2010/070171, filed on Jan. 14, 2010, which claims priority to Chinese Patent Application No. 200910005200.5, filed on Feb. 10, 2009, both of which are hereby incorporated by reference in their entireties.

FIELD OF THE TECHNOLOGY

The present invention relates to the field of communication technology, and more particularly to a method and a device for mapping and demapping a client signal.

BACKGROUND

The Optical Transport Network (OTN) technology is the core technology for next-generation transport networks. The OTN has strong Tandem Connection Monitoring (TCM) capability, abundant Operation Administration Maintenance (OAM) capability, and out-band Forward Error Correction (FEC) capability, can perform flexible scheduling and management of large-capacity services, and is applicable to backbone transport networks.

Figure 1:
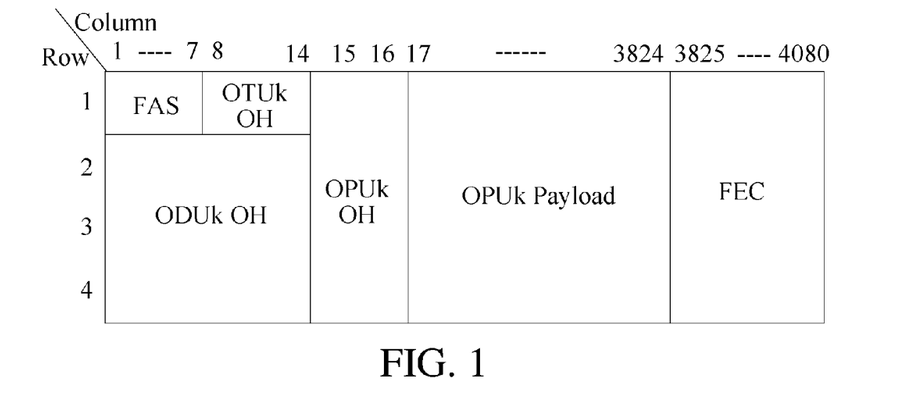
FIG. 1 is a schematic structural view of an OTN frame provided in the prior art.

In order to meet the market demand, the International Telecommunication Union-Telecommunication Standardization Sector (ITU-T) has formulated a series of recommendations for the OTN, among which the Recommendation G.709 is a standard mainly in regard to the structure and mapping of OTN frames. The standard frame structure defined in the Recommendation G.709 is as shown in FIG. 1. An OTN frame is a 4080*4 modular structure, and includes: a Frame Alignment Signal (FAS), configured to provide a frame synchronization and alignment function; Optical Channel Transport Unit (OTU)-k (OTUk) Overhead (OH), configured to provide an OTU-level network management function; Optical Channel Data Unit-k (ODUk) OH, configured to provide a maintenance and operation function; Optical Channel Payload Unit-k (OPUk) OH, configured to provide a service adaptation function; an OPUk payload area, also referred to as a payload area of the OTN frame, mainly configured to provide a service bearer function; and an FEC area, configured to provide an error detection and correction function.

In a scenario of transporting high rate service, if a client signal is mapped to the OPUk payload through an existing mapping method, the mapping process is rather complicated. For example, when the client signal is mapped to OPU0 through an existing mapping method based on the Generic Mapping Procedure (GMP), if the bit width for processing is 16*8 bits, each clock cycle requires 16 times of sigma-delta calculation in order to complete the mapping of the client signal in the clock cycle, so that the mapping process is complicated.

SUMMARY

Accordingly, the present invention is directed to a method and a device for mapping and demapping a client signal, which simplifies the mapping and demapping process of a client signal, and is applicable to multi-rate services.

In order to solve the above technical problems, the present invention provides the following technical solutions.

In an embodiment, the present invention provides a method for mapping a client signal, which includes: dividing a part or all of a payload area of an Optical Channel Payload Unit (OPU) into several sub-blocks, in which the sub-blocks have a size of N bytes, and N is greater than 1; and calculating a block number of the client signal to be transported according to the sub-block size of the payload area, wherein the client signal has a block size of N bytes; generating mapping overhead (OH) information which comprises indication information of the block number of the client signal to be transported, and mapping the mapping OH information to an OH area, wherein the indication information of the block number of the client to be transported comprises a bit reversal field and an increment/decrement indication field, and the bit reversal field and the increment/decrement indication field jointly indicate the block number of the client signal through bit reversal; determining a position distribution of the client signal to be transported in the sub-blocks of the payload area by using the block number; and mapping the client signal to be transported to corresponding sub-blocks of the payload area with an N-byte granularity according to the determined position distribution.

Further, in an embodiment, the present invention provides a method for demapping a client signal, which includes: acquiring indication information of a block number of a client signal borne by a payload area of an OPU or ODTU, in which the blocks have a size of N bytes, and N is greater than or equal to 1; determining a position distribution of the client signal in sub-blocks of the payload area by using the block number, in which the payload area includes several blocks having a size of N bytes; and demapping the client signal of the payload area according to the determined position distribution.

Further, in an embodiment, the present invention provides a device for mapping a client signal, which includes: a block number calculating module, configured to calculate a block number of a client signal to be transported according to a sub-block size of a payload area of an OPU or Optical channel Data Tributary Unit (ODTU), in which the payload area includes several sub-blocks having a size of N bytes, and N is greater than or equal to 1; a mapping control module, configured to generate a control signal according to the block number of the client signal, in which the control signal is configured to indicate a position distribution of the client signal to be transported in the sub-blocks of the payload area; and a mapping module, configured to map the client signal, to be transported, in a buffer to corresponding sub-blocks of the payload area with an N-byte granularity according to the control signal.

Further, in an embodiment, the present invention provides a device for demapping a client signal, which includes: a demapping control module, configured to acquire a block number of a client signal borne by a payload area of an OPU or ODTU, and generate a control signal according to the block number, in which the control signal is configured to indicate a position distribution of the client signal in sub-blocks of the payload area, the payload area includes several blocks having a size of N bytes, and N is greater than or equal to 1; and a demapping module, configured to demap the client signal borne by the payload area according to the control signal generated by the demapping control module.

Further, in another embodiment, the present invention provides a method for mapping a client signal, which includes: dividing a part or all of a payload area of an Optical Channel Payload Unit (OPU) into several sub-blocks, wherein the sub-blocks have a size of N bytes, and N is greater than 1; calculating a block number of the client signal to be transported according to the sub-block size of the payload area, wherein the client signal has a block size of N bytes; determining a position distribution of the client signal to be transported in the sub-blocks of the payload area by using the block number, and mapping the client signal to be transported to corresponding sub-blocks of the payload area with an N-byte granularity according to the determined position distribution.

It can be seen from the above that the technical solutions adopted by the embodiments of the present invention have the following beneficial effects: when the client signal is mapped, block mapping of the client signal is performed by using a mapping granularity of a block, so that the mapping process of the client signal can be simplified, thereby meeting requirements of multi-rate services.

BRIEF DESCRIPTION OF THE DRAWINGS

To illustrate the technical solutions according to the embodiments of the present invention and in the prior art more clearly, the accompanying drawings for describing the embodiments and the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The present invention provides a method and a device for mapping and demapping a client signal, which performs block mapping of client data with a mapping granularity of a block, simplifies the mapping process of the client signal, and is applicable to multi-rate services.

Detailed description is given below through specific embodiments.

In the implementation of the present invention, mapping of the client signal based on a GMP mapping manner is taken as an example for illustration, but the present invention is not limited thereto, and other mapping manners may also be used.

An OPUk payload area may include several logically divided sub-blocks having a size of N bytes, and preferably, N is an integer not smaller than 1.

First Embodiment

Figure 2:
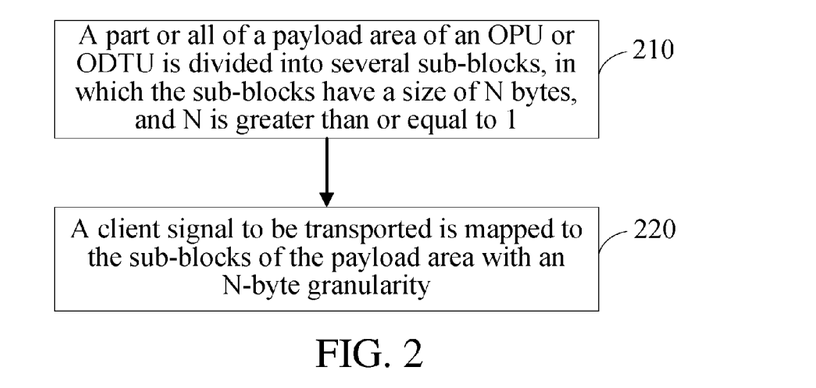
FIG. 2 is a flow chart of a method for mapping a client signal according to a first embodiment of the present invention.

Referring to FIG. 2, a method for mapping a client signal according to a first embodiment of the present invention specifically includes the following steps.

In Step 210, a part or all of a payload area of an OPU or ODTU is divided into several sub-blocks, in which the sub-blocks have a size of N bytes, and N is greater than or equal to 1.

In Step 220, a client signal to be transported is mapped to the sub-blocks of the payload area with an N-byte granularity.

It can be seen that, in the embodiment of the present invention, when the client signal is mapped, block mapping of the client signal is performed by using a mapping granularity of a block, so that the mapping process of the client signal is simplified, thereby meeting requirements of multi-rate services.

Second Embodiment

Figure 3:
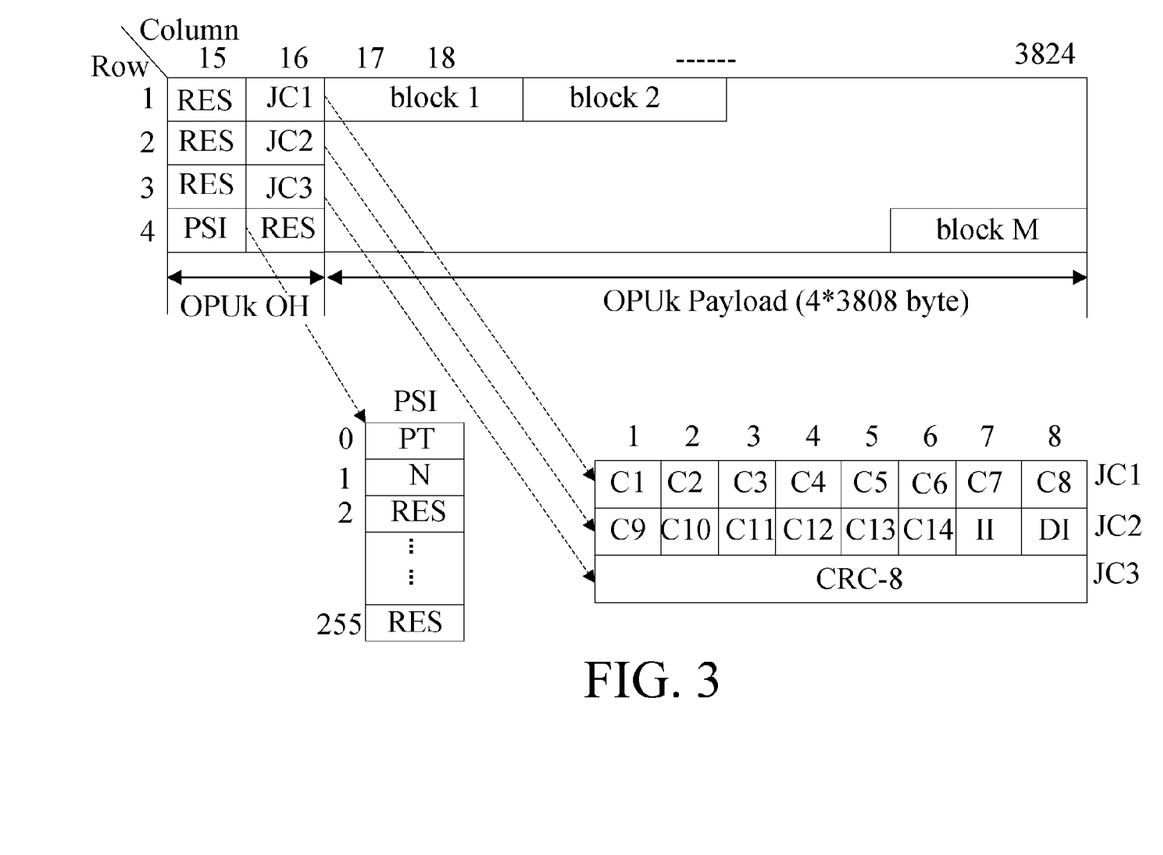
FIG. 3 is a schematic structural view of an OPUk payload area and an OPUk OH area according to a second embodiment of the present invention.

FIG. 3 is a schematic structural view of an OPUk payload area and an OPUk OH area according to a second embodiment of the present invention. Referring to FIG. 3, in this embodiment, the OPUk payload area is logically divided into M sub-blocks each having a size of N bytes, and the entire OPUk payload area has a size of M*N bytes.

It should be understood that, the size of the logically divided sub-blocks of the OPUk payload area may be arbitrary, that is to say, N may be any value that is exactly divisible by the byte number of the OPUk payload area.

Preferably, the OPUk payload area may be logically divided into the sub-blocks according to a processing bit width of a processor, and the size of the logically divided sub-blocks is a submultiple of the processing bit width of the processor. For example, assuming that the processing bit width of the processor is 16*8=128 bits, the size of the logically divided sub-blocks may be 16 bytes, 8 bytes, 4 bytes, 2 bytes, or 1 byte.

It should be noted that, this embodiment takes the $17^{th}$ to $3824^{th}$ columns of the $1^{st}$ to $4^{th}$ rows of an OTN frame (briefly referred to as a frame in the following) as an example of the OPUk payload area for illustration, but is not limited thereto, and the OPUk payload area may further include reserved bytes in the OPUk OH area and/or other OH bytes for bearing the client signal.

Figure 4:
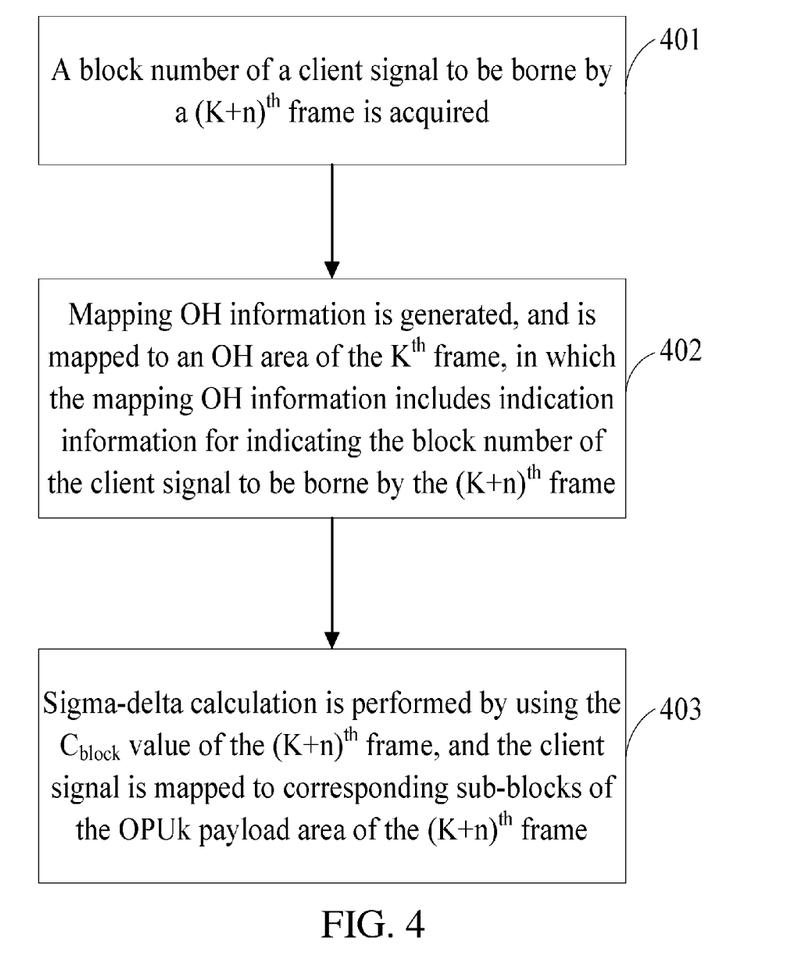
FIG. 4 is a flow chart of a method for mapping a client signal according to the second embodiment of the present invention.

Referring to FIG. 4, a method for mapping a client signal according to a second embodiment of the present invention specifically includes the following steps.

In Step 401, a block number of a client signal to be borne by a $(K+n)^{th}$ frame is acquired.

It should be noted that, in an OTN frame structure, mapping OH information carried by an OPUk OH area of a $K^{th}$ frame is configured to indicate a block number of a client signal to be borne by the $(K+n)^{th}$ frame, a receiving end obtains mapping related information of the client signal borne by the $(K+n)^{th}$ frame by receiving the mapping OH information carried by the OPUk OH area of the $K^{th}$ frame, and thus can demap the $(K+n)^{th}$ frame to recover the client signal borne by the $(K+n)^{th}$ frame after receiving the $(K+n)^{th}$ frame. Here, K is a positive integer, and n is a natural number.

For example, the block number of the client signal to be borne by the $(K+n)^{th}$ frame may be determined according to the bearer capability of the OTN frame and the size of the logically divided sub-blocks of the OPUk payload area of the $(K+n)^{th}$ frame, and the size of the blocks of the client signal is identical to the size of the logically divided sub-blocks of the OPUk payload area, that is, N bytes.

A specific implementation may be as follows: a byte number (represented by A in the following) of the client signal to be borne by the $(K+n)^{th}$ frame is determined first, the determined byte number is divided by the size of the logically divided sub-blocks of the OPUk payload area, and the result of exact division can be taken as the block number (represented by $C_{block}$ in the following) of the client signal to be borne by the $(K+n)^{th}$ frame, in which the relation between A, $C_{block}$, and N is $A=C_{block}*N+C$, where C is the remainder. The $(K+n)^{th}$ frame needs to bear $C_{block}*N$ bytes of the client signal, in which $C_{block}*N$ is not greater than the byte number of the entire OPUk payload area of the $(K+n)^{th}$ frame, that is, not greater than the maximum bearer capability of the $(K+n)^{th}$ frame.

For example, assuming that the size of the logically divided sub-blocks of the OPUk payload area of the $(K+n)^{th}$ frame is N=4, and the determined byte number of the client signal to be borne by the $(K+n)^{th}$ frame is A=14408, it can be further determined that the block number of the client signal to be borne by the $(K+n)^{th}$ frame is $C_{block}$=3602, in which $A=C_{block}*N+0$, that is to say, the $(K+n)^{th}$ frame needs to bear $C_{block}*N$=14408 bytes of the client signal.

For another example, assuming that the size of the logically divided sub-blocks of the OPUk payload area of the $(K+n)^{th}$ frame is N=4, and the determined byte number of the client signal to be borne by the $(K+n)^{th}$ frame is A=14407, it can be further determined that the block number of the client signal to be borne by the $(K+n)^{th}$ frame is $C_{block}$=3601, in which $A=C_{block}*N+3$, that is to say, the $(K+n)^{th}$ frame needs to bear $C_{block}*N$=14404 bytes of the client signal, and the remaining 3 bytes of the client signal may be borne by subsequent frames.

In Step 402, mapping OH information is generated, and is mapped to an OH area of the $K^{th}$ frame, in which the mapping OH information includes indication information for indicating the block number of the client signal to be borne by the $(K+n)^{th}$ frame.

The mapping OH information may include, but is not limited to, indication information for indicating the size of the logically divided sub-blocks of the OPUk payload area of the $(K+n)^{th}$ frame, the block number of the client signal to be borne by the $(K+n)^{th}$ frame, a mapping manner of the $(K+n)^{th}$ frame and the like.

A specific implementation may be as follows: the mapping OH information is mapped to an OPUk OH area of the $K^{th}$ frame. The structure of the OPUk OH area may be as shown in FIG. 3. The OPUk OH area is located at the $15^{th}$ and $16^{th}$ columns of the $1^{st}$ to $4^{th}$ rows of the OTN frame, and includes 2*4 bytes. The OPUk OH area may be divided as follows, but is not limited thereto.

Three bytes of the $1^{st}$ to $3^{rd}$ rows of the $15^{th}$ column of the OTN frame are reserved (RES) bytes, and 1 byte of the $4^{th}$ row is a payload structure identifier (PSI) byte. Assuming that a multiframe period of the OTN frame is 256, PSI[0] may carry indication information of a payload type (PT) identifier, that is, indication information of a mapping type, and in this embodiment, the indication information carried by PSI[0] indicates a GMP mapping manner; PSI[1] may carry indication information for indicating the size of the logically divided sub-blocks of the OPUk payload area, and may be, for example, 0x04, indicating that the sub-block size is 4 bytes; and PSI[2] to PSI[255] may serve as reserved bytes.

Three bytes of the $1^{st}$ to $3^{rd}$ rows of the $16^{th}$ column of the OTN frame are JC1, JC2, and JC3 bytes, as shown in FIG. 3. The JC1, JC2, and JC3 bytes form a 14-bit $C_{block}$ field (bits C1, C2, ..., C14), a 1-bit Increment Indicator (II) field and a 1-bit Decrement Indicator (DI) field, and an 8-bit cyclic redundancy check (CRC-8) field for performing error correction coding on JC1 and JC2.

The $C_{block}$ field of the $K^{th}$ frame carries indication information for indicating the block number of the client signal to be borne by the $(K+n)^{th}$ frame, and specifically, the block number may be indicated in a variety of manners. For example, the $C_{block}$ field of the $K^{th}$ frame may directly carry the block number of the client signal borne by the $(K+n)^{th}$ frame; or the $C_{block}$ value of the $(K+n)^{th}$ frame may be indicated to the receiving end by means of Ci bit reversal, and a corresponding relation between Ci bit reversal and the change of the $C_{block}$ value is as shown in Table 1, but is not limited thereto.

TABLE 1

| C1 | C2 | C3 | C4 | C5 | C6 | C7 | C8 | C9 | C10 | C11 | C12 | C13 | C14 | II | DI | Variable Value |
|----|----|----|----|----|----|----|----|----|----|----|----|----|----|----|----|----|
| 0 | 0 | 0 | 0 | 0 | 0 | 0 | 0 | 0 | 0 | 0 | 0 | 0 | 0 | 0 | 0 | 0 |
| 1 | 0 | 1 | 0 | 1 | 0 | 1 | 0 | 1 | 0 | 1 | 0 | 1 | 0 | 1 | 0 | +1 |
| 0 | 1 | 0 | 1 | 0 | 1 | 0 | 1 | 0 | 1 | 0 | 1 | 0 | 1 | 0 | 1 | −1 |
| 0 | 1 | 1 | 0 | 0 | 1 | 1 | 0 | 0 | 1 | 1 | 0 | 0 | 1 | 1 | 0 | +2 |
| 1 | 0 | 0 | 1 | 1 | 0 | 0 | 1 | 1 | 0 | 0 | 1 | 1 | 0 | 0 | 1 | −2 |
| | | | | | | Block number | | | | | | | | 1 | 1 | Others |

As shown in Table 1, when $C_{block}$ of the client signal borne by the $(K+n)^{th}$ frame is incremented by 1 or 2 as compared with the Cblock corresponding to the $(K+n-1)^{th}$ frame, a part of bits (Ci) in the $C_{block}$ field of the $K^{th}$ frame are bit-reversed, and the II field is set to 1, so as to indicate to the receiving end that the block number of the client signal borne by the $(K+n)^{th}$ frame is incremented by 1 or 2.

When $C_{block}$ of the $(K+n)^{th}$ frame is decremented by 1 or 2, a part of Ci in the $C_{block}$ field of the $K^{th}$ frame is bit-reversed, and the DI field is set to 1, so as to indicate to the receiving end that the block number of the client signal borne by the $(K+n)^{th}$ frame is decremented by 1 or 2.

When the change of $C_{block}$ of the $(K+n)^{th}$ frame is greater than +2 or −2, both the II and DI fields of the $K^{th}$ frame are set to 1, and the $C_{block}$ field directly carries the $C_{block}$ value of the $(K+n)^{th}$ frame, so as to indicate the block number of the client signal borne by the $(K+n)^{th}$ frame to the receiving end, and CRC-8 verifies the $C_{block}$ value and provides certain error correction capability.

When the $C_{block}$ value of the $(K+n)^{th}$ frame does not change, both the II and DI bits of the $K^{th}$ frame are set to 0.

It can be seen that, the method for indicating the $C_{block}$ value of the $(K+n)^{th}$ frame to the receiving end through bit reversal can further ensure the effectiveness of transmission, is beneficial for error correction, and can reduce the probability of error transmission.

Figure 5:
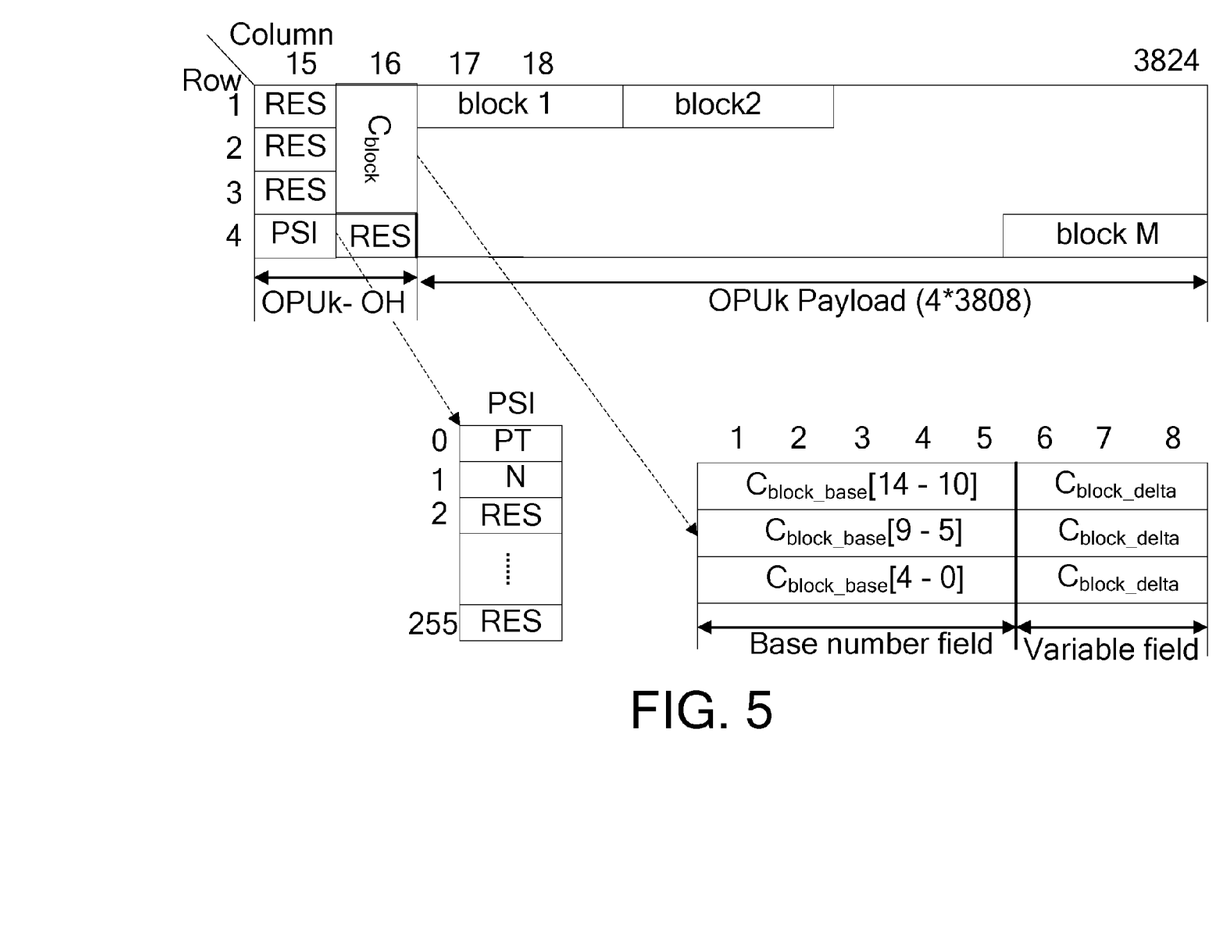
FIG. 5 is another schematic structural view of the OPUk payload area and the OPUk OH area according to the second embodiment of the present invention.

Optionally, the OH bytes (which may be referred to as $C_{block}$ bytes) of the 1$^{st}$ to 3$^{rd}$ rows of the 16$^{th}$ column of the OTN frame may use another structure to carry indication information for indicating the $C_{block}$ value, which is specifically as shown in FIG. 5, but is not limited thereto: including a $C_{block\_base}$ field (base number field) of 3*5 bits and a $C_{block\_delta}$ field (variable field) of 3*3 bits.

The base number field of the $C_{block}$ bytes is configured to carry a minimum value of the block number of the client signal carried by each frame, the value is taken as a base number ($C_{block\_base}$), and each frame carries the base number; and the variable field of the $C_{block}$ bytes of the $K^{th}$ frame is configured to carry a variable value ($C_{block\_delta}$) obtained by subtracting the base number from the block number of the client signal borne by $(K+n)^{th}$ frame for three times, and the receiving end can determine that the block number of the client signal borne by the $(K+n)^{th}$ frame is $C_{block}=C_{block\_base}+C_{block\_delta}$ according to the $C_{block\_base}$ and $C_{block\_delta}$ values carried by the $C_{block}$ bytes of the $K^{th}$ frame.

It can be seen that, in the method for indicating the $C_{block}$ value of the $(K+n)^{th}$ frame to the receiving end by using the base number value and the variable value, since the same base number value is carried, the reliability of transmission is ensured; in addition, since each frame carries the variable value for three times, the reliability of transmission is further ensured.

The mapping OH information of the $(K+n)^{th}$ frame is sent to the receiving end by using the $K^{th}$ frame. After receiving the $K^{th}$ frame, the receiving end can determine the $C_{block}$ value of the $(K+n)^{th}$ frame, the size of the logically divided sub-blocks of the OPUk payload area, a mapping manner and the like, and thus can correctly demap the client signal borne by the $(K+n)^{th}$ frame.

It should be understood that, a part or all of the indication information in the mapping OH information may be indicated to the receiving end in a default manner. For example, for OPUk units of different rates, the size of the logically divided sub-blocks of the payload area may be corresponding to a certain value by default, and the specific correspondence is as shown in Table 2, but is not limited thereto.

TABLE 2

| Sub-block Size (byte) | OPUk/ODTUjk |
| --- | --- |
| 1 | OPU0/ODTU01/ODTU02/ODTU03/ODTU04 |
| 2 | OPU1/ODTU12/ODTU13/ODTU14 |
| 8 | OPU2/ODTU23/ODTU24 |
| 8 | OPU2e/ODTU2e3/ODTU2e4 |
| 16 | OPU3y/ODTU34 |
| 64 | OPU4 |

It can be seen that, by using the indication through the default correspondence between sub-block sizes and rate levels shown in Table 2, the receiving end can directly determine the size of the logically divided sub-blocks of the OPUk payload area according to a rate level of the received OTN frame, and thus can demap the client signal in combination with other indication information.

Moreover, clock information and client signal information may be respectively carried through different OH fields, and mapping by using a granularity of a block does not affect the clock performance.

It should be noted that, the above method for carrying the mapping OH information by using the OPUk OH area is illustrated based on an example only, but the present invention is not limited thereto, and the mapping OH information of the $(K+n)^{th}$ frame may also be carried to the receiving end by using the OPUk OH area of the $K^{th}$ frame through other methods.

In Step 403, sigma-delta calculation is performed by using the $C_{block}$ value of the $(K+n)^{th}$ frame, and the client signal is mapped to corresponding sub-blocks of the OPUk payload area of the $(K+n)^{th}$ frame.

The sigma-delta calculation is performed by using the acquired block number of the client signal to be borne by the $(K+n)^{th}$ frame, so a position distribution of the client signal in the OPUk payload area can be obtained, and the client signal to be borne by the $(K+n)^{th}$ frame can be uniformly mapped to corresponding sub-blocks of the OPUk payload area of the $(K+n)^{th}$ frame with an N-byte granularity, so that client signal sub-blocks and stuff sub-blocks are uniformly distributed in the OPUk payload area of the $(K+n)^{th}$ frame.

The sigma-delta calculation is briefly illustrated in the following.

If $(i \times C_{block}) \bmod M < C_{block}$, the $i^{th}$ sub-block is a client signal sub-block.

If $(i \times C_{block}) \bmod M \geq C_{block}$, the $i^{th}$ sub-block is a stuff sub-block, in which $C_{block}$ is the block number of the borne client signal, and M is the total number of the logically divided sub-blocks of the OPUk payload area.

In the framing process, when a row/column counter indicates that rows/columns processed in a current clock cycle are located or partially located at the OPUk payload area, an adder/comparator performs the sigma-delta calculation, and determines whether a sub-block corresponding to the rows/columns processed in the current clock cycle is a sub-block to which the client signal is mapped, and if yes, uses the sub-block as a client signal sub-block and the client signal is mapped to the sub-block; otherwise, uses the sub-block as a stuff sub-block.

For example, it is assumed that the processing bit width of the processor is 16*8=128 bits, the size of the logically divided sub-blocks of the OPUk payload area of the $(K+n)^{th}$ frame is N=8 bytes, and the entire OPUk payload area is divided into M=1904 sub-blocks. When the row/column counter indicates that the rows/columns processed in the current clock cycle are located in the OPUk payload area, only an 11-bit adder/comparator needs to be selected to perform sigma-delta calculation twice in the clock cycle, so as to complete mapping of 2 sub-blocks (2*8 bytes). If a decision granularity of a byte is used, a 14-bit adder/comparator needs to be selected to perform sigma-delta calculation for 16 times, so as to complete mapping of 16 bytes.

For another example, assuming that the processing bit width for the OPU4 is 64*8=512 bits, if the OPU4 payload area of the $(K+n)^{th}$ frame is logically divided into 238 sub-blocks each having 64 bytes, only an 8-bit adder/comparator needs to select to perform sigma-delta calculation once in a processor clock cycle, so as to complete mapping of 1 sub-block (64 bytes). Similarly, if a decision granularity of a byte is used, a 14-bit adder/comparator needs to be selected to perform sigma-delta calculation for 64 times so as to complete mapping of 64 bytes.

It can be seen that, for high rate units such as OPU3y and OPU4, the payload area may be logically divided into several sub-blocks of 16 bytes, 32 bytes, or 64 bytes flexibly, and sigma-delta calculation is performed by using a decision granularity of a block, so that the mapping process can be greatly simplified.

Optionally, several phase relations of stuff sub-blocks and client signal sub-blocks in the OPUk payload area may also be preset corresponding to the sub-block size of each type of logical division of the OPUk payload area, and each phase relation is corresponding to the block number of the client signal borne by the OPUk payload area, so that when the client signal is mapped, the client signal can be fixedly mapped to the client signal sub-blocks of the OPUk payload area directly according to the preset phase relations.

The mapping of the client signal through phase presetting of stuff sub-blocks and client signal sub-blocks can greatly reduce the decision and calculation amount, and simplify the mapping process, thereby achieving flexible processing.

Further, the $(K+n)^{th}$ frame is sent after the OH area information of the $(K+n)^{th}$ frame is generated.

Correspondingly, in an embodiment, the present invention further provides a method for demapping a client signal.

Figure 6:
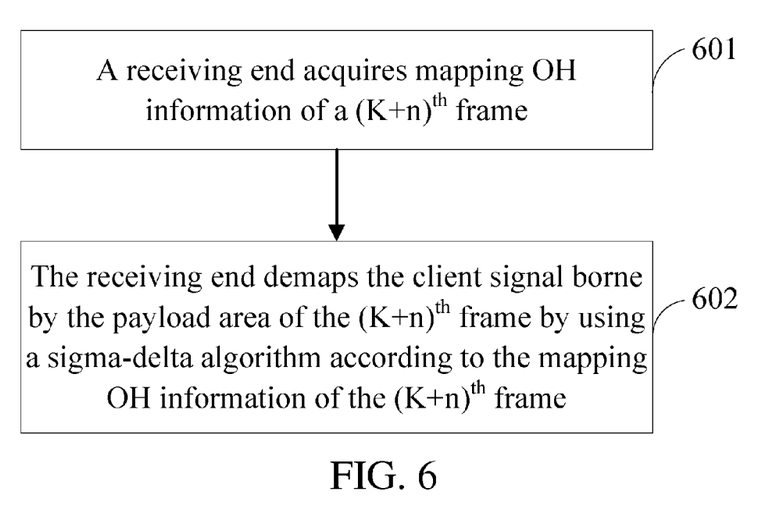
FIG. 6 is a flow chart of a method for demapping a client signal according to the second embodiment of the present invention.

Referring to FIG. 6, a method for demapping a client signal according to the second embodiment of the present invention specifically includes the following steps.

In Step 601, a receiving end acquires mapping OH information of a $(K+n)^{th}$ frame.

The receiving end can acquire the mapping OH information of the $(K+n)^{th}$ frame by demapping an OPUk OH area of a $K^{th}$ frame. The acquired mapping OH information includes, but is not limited to, indication information of a block number of a client signal borne by a payload area, a size of logically divided sub-blocks of the payload area, a mapping manner and the like.

In Step 602, the receiving end demaps the client signal borne by the payload area of the $(K+n)^{th}$ frame by using a sigma-delta algorithm according to the mapping OH information of the $(K+n)^{th}$ frame.

Correspondingly, the receiving end may determine a mapping manner of the $(K+n)^{th}$ frame, the size of the logically divided sub-blocks of the payload area, and the block number of the borne client signal according to the mapping OH information. The receiving end can determine a position distribution of the client signal in the sub-blocks of the payload area by using the sigma-delta algorithm according to the above information, that is, determine the client signal sub-blocks and the stuff sub-blocks, and thus can demap the client signal of the payload area to recover the client signal according to the determined position distribution.

It can be seen that, in this embodiment, the OPUk payload area is logically divided into blocks flexibly, and when the client signal is mapped, block mapping of the client signal is performed by using a mapping decision granularity of a block, so that the mapping process of the client signal is simplified, thereby meeting requirements of multi-rate services.

Further, the OPUk payload area may be divided into blocks flexibly through many different schemes.

Third Embodiment

Figure 7:
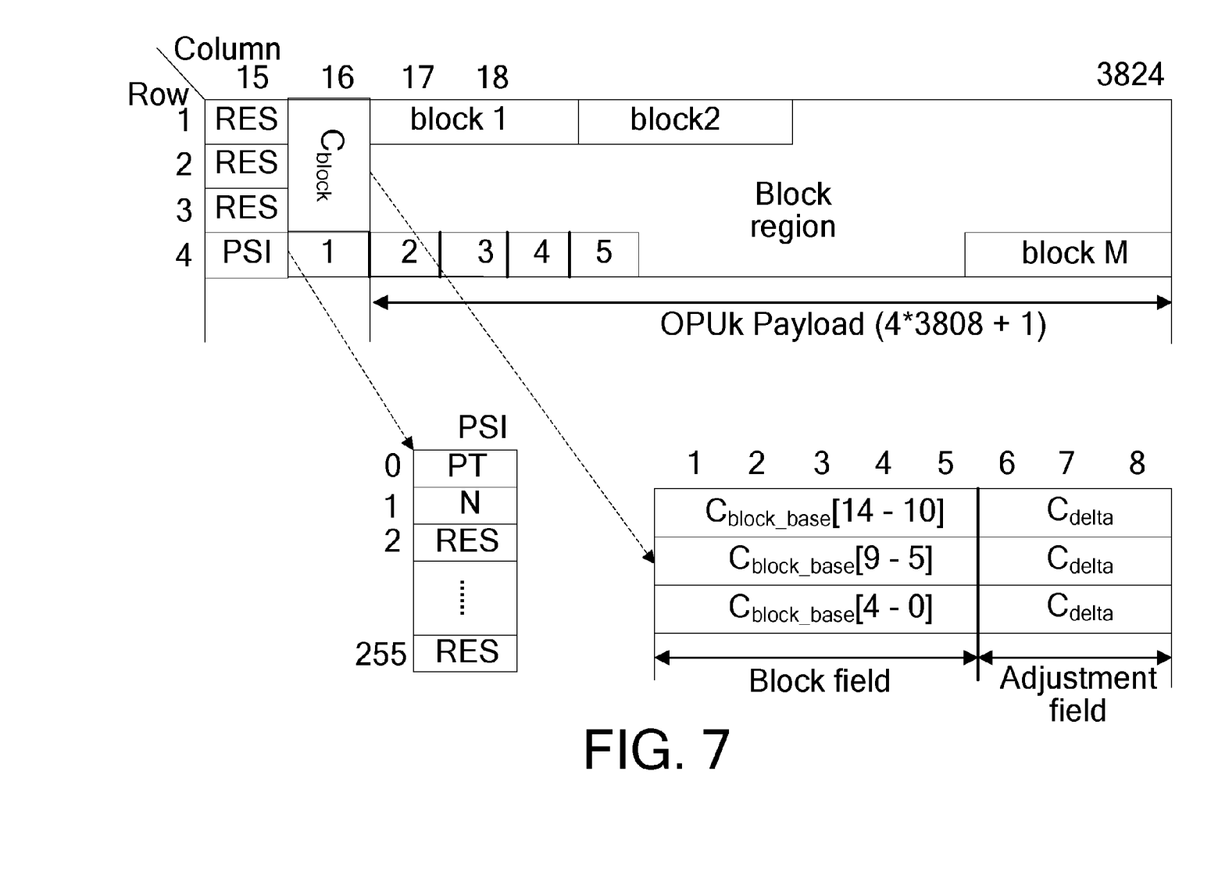
FIG. 7 is a schematic structural view of an OPUk payload area and an OPUk OH area according to a third embodiment of the present invention.

FIG. 7 is a schematic structural view of an OPUk payload area and an OPUk OH area according to a third embodiment of the present invention. Referring to FIG. 7, in this embodiment, the OPUk payload area is divided into a block region and an adjustment region. The block region is logically divided into M sub-blocks each having a size of N bytes, and the entire block region has a size of M*N bytes.

It should be understood that, the size of the logically divided sub-blocks of the OPUk block region may be arbitrary, that is to say, N may be any value that is exactly divisible by the byte number of the OPUk block region.

Preferably, the OPUk block region may be logically divided into the sub-blocks according to a processing bit width of a processor, and the size of the logically divided sub-blocks is a submultiple of the processing bit width of the processor. For example, assuming that the processing bit width of the processor is 16*8=128 bits, the size of the logically divided sub-blocks may be 16 bytes, 8 bytes, 4 bytes, 2 bytes, or 1 byte.

It should be noted that, this embodiment takes the $17^{th}$ to $3824^{th}$ columns of the $1^{st}$ to $4^{th}$ rows and the $16^{th}$ column of the $4^{th}$ row of an OTN frame as an example of the OPUk payload area for illustration, but is not limited thereto, and the OPUk payload area may further include other reserved bytes in the OPUk OH area and/or other OH bytes for bearing the client signal.

It should be noted that, this embodiment takes the $16^{th}$ to $20^{th}$ columns of the $4^{th}$ row of the OTN frame as an example of the adjustment region and other portions of the OPUk payload area as an example of the block region for illustration, but is not limited thereto, and the size ratio and positions of the OPUk adjustment region and block region may be flexibly adjusted.

Figure 8:
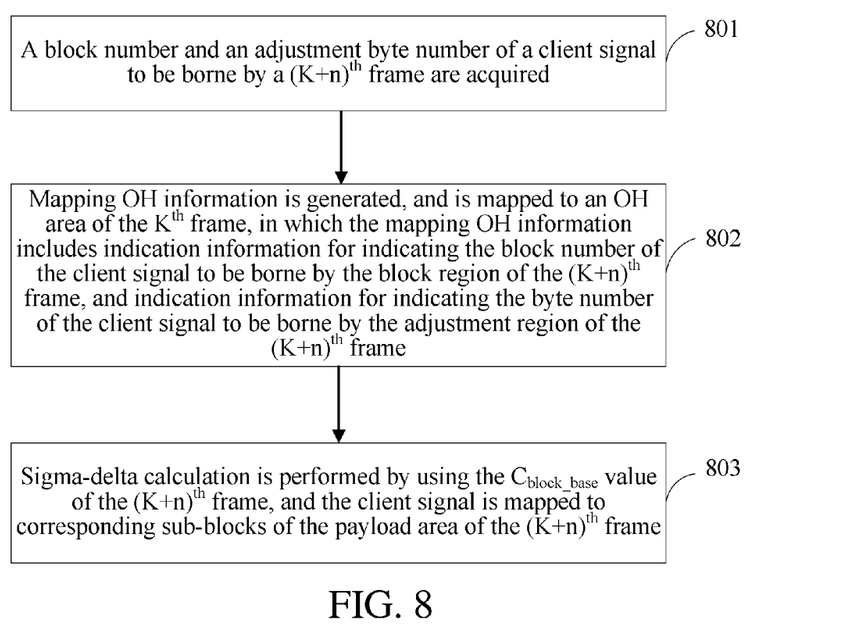
FIG. 8 is a flow chart of a method for mapping a client signal according to the third embodiment of the present invention.

Referring to FIG. 8, a method for mapping a client signal according to the third embodiment of the present invention specifically includes the following steps.

In Step 801, a block number and an adjustment byte number of a client signal to be borne by a $(K+n)^{th}$ frame are acquired.

For example, the block number of the client signal to be borne by the $(K+n)^{th}$ frame may be determined according to the bearer capability of the OTN frame and the size of the logically divided sub-blocks of the OPUk block region of the $(K+n)^{th}$ frame, and the size of the data blocks is identical to the size of the logically divided sub-blocks of the corresponding OPUk block region, that is, N bytes.

A specific implementation may be as follows: a byte number (represented by A in the following) of the client signal to be borne by the $(K+n)^{th}$ frame is determined first, the determined byte number is divided by the size of the logically divided sub-blocks of the OPUk block region, the result of exact division can be taken as the block number (represented by $C_{block\_base}$ in the following) of the client signal to be borne by the $(K+n)^{th}$ frame, and the remainder can be taken as the adjustment byte number (represented by $C_{delta}$ in the following), in which the relation between A, $C_{block\_base}$, N, and $C_{delta}$ is $A=C_{block\_base}*N+C_{delta}$. The $(K+n)^{th}$ frame needs to bear $C_{block\_base}*N+C_{delta}$ bytes of the client signal, in which $C_{block\_base}*N$ is not greater than the byte number of the block region of the $(K+n)^{th}$ frame, and $C_{delta}$ is not greater than the byte number of the adjustment region.

For example, assuming that the size of the logically divided sub-blocks of the OPUk block region of the $(K+n)^{th}$ frame is N=4, and the determined byte number of the client signal to be borne by the $(K+n)^{th}$ frame is A=14408, it can be further determined that the block number of the client signal to be borne by the $(K+n)^{th}$ frame is $C_{block\_base}=3602$, in which $A=C_{block\_base}*N+0$, that is to say, the block region of the $(K+n)^{th}$ frame needs to bear $C_{block}*N=14408$ bytes of the client signal, and the adjustment region needs to bear 0 bytes of the client signal.

For another example, assuming that the size of the logically divided sub-blocks of the block region of the $(K+n)^{th}$ frame is N=4, and the determined byte number of the client signal to be borne by the $(K+n)^{th}$ frame is A=14407, it can be further determined that the block number of the client signal to be borne by the block region of the $(K+n)^{th}$ frame is $C_{block\_base}=3601$, in which $A=C_{block\_base}*N+3$, that is to say, the block region of the $(K+n)^{th}$ frame needs to bear $C_{block\_base}*N=14404$ bytes of the client signal, and the adjustment region needs to bear the remaining 3 bytes of the client signal.

In Step 802, mapping OH information is generated, and is mapped to an OH area of the $K^{th}$ frame, in which the mapping OH information includes indication information for indicating the block number of the client signal to be borne by the block region of the $(K+n)^{th}$ frame, and indication information for indicating the byte number of the client signal to be borne by the adjustment region of the $(K+n)^{th}$ frame.

The mapping OH information may include, but is not limited to, indication information for indicating the size of the logically divided sub-blocks of the OPUk block region of the $(K+n)^{th}$ frame, the block number of the client signal to be borne by the OPUk block region of the $(K+n)^{th}$ frame, the byte number of the client signal to be borne by the OPUk adjustment region of the $(K+n)^{th}$ frame, a mapping manner of the $(K+n)^{th}$ frame and the like.

A specific implementation may be as follows: the mapping OH information is mapped to an OPUk OH area of the $K^{th}$ frame. The structure of the OPUk OH area may be as shown in FIG. 7. The OPUk OH area is located at the $1^{st}$ to $4^{th}$ rows of the $15^{th}$ column and the $1^{st}$ to $3^{rd}$ rows of the $16^{th}$ column of the OTN frame, and includes 4+3 bytes. The OPUk OH area may be divided as follows, but is not limited thereto.

Three bytes of the $1^{st}$ to $3^{rd}$ rows of the $15^{th}$ column of the OTN frame are reserved (RES) bytes, and 1 byte of the $4^{th}$ row is a PSI byte. Assuming that a multiframe period of the OTN frame is 256, PSI[0] may carry indication information of a PT identifier, and in this embodiment, the indication information carried by PSI[0] indicates a GMP mapping manner; PSI[1] may carry indication information for indicating the size of the logically divided sub-blocks of the OPUk block region, and may be, for example, 0x04, indicating that the block size is 4 bytes; and PSI[2] to PSI[255] may serve as reserved bytes.

Three OH bytes of the $1^{st}$ to $3^{rd}$ rows of the $16^{th}$ column of the OTN frame are $C_{block}$ bytes, as shown in FIG. 7. The $C_{block}$ bytes are divided into a (3*5)-bit $C_{block\_base}$ field (block field) and a (3*3)-bit $C_{delta}$ field (adjustment field), in which the block field of the $C_{block}$ bytes of the $K^{th}$ frame carries indication information for indicating the block number ($C_{block\_base}$) of the client signal borne by the OPUk block region of the $(K+n)^{th}$ frame, and the adjustment field carries indication information for indicating the byte number ($C_{delta}$) of the client signal borne by the OPUk adjustment region of the $(K+n)^{th}$ frame for three times. The receiving end can determine the block number of the client signal borne by the OPUk block region of the $(K+n)^{th}$ frame and the byte number of the client signal borne by the OPUk adjustment region of the $(K+n)^{th}$ frame according to the indication information carried by the $C_{block}$ bytes of the $K^{th}$ frame.

The position and size of the adjustment region may be default, or the corresponding indication information may be carried to the receiving end through other OH bytes, which can be flexibly selected.

For example, assuming that the block number of the client signal to be borne by the block region of the $(K+n)^{th}$ frame is $C_{block\_base}=3586$, and the adjustment region needs to bear $C_{delta}=3$ bytes of the client signal, the block field of the $C_{block}$ bytes of the $K^{th}$ frame carries a binary code 000111000000010, and the adjustment field carries three identical binary codes 011.

Moreover, clock information and client signal information may be respectively carried through different OH fields, and mapping by using a granularity of a block does not affect the clock performance.

Optionally, similar to the second embodiment, a part or all of the indication information in the mapping OH information may be indicated to the receiving end in a default manner, for example, a rate level of the OTN frame may be used to indicate the size of the logically divided sub-blocks of the block region of the OPUk payload area by default, which may be specifically as shown in Table 2.

It should be noted that, the above method for carrying the mapping OH information by using the OPUk OH area is illustrated by way of example only, but the present invention is not limited thereto, and the mapping OH information of the $(K+n)^{th}$ frame may also be carried to the receiving end by using the OPUk OH area of the $K^{th}$ frame through other methods.

The mapping OH information of the $(K+n)^{th}$ frame is sent to the receiving end by using the $K^{th}$ frame. After receiving the $K^{th}$ frame, the receiving end can determine the $C_{block\_base}$ value and $C_{delta}$ value of the $(K+n)^{th}$ frame, the size of the logically divided sub-blocks of the block region of the OPUk payload area, a mapping manner and the like, and thus can correctly demap the client signal borne by the $(K+n)^{th}$ frame.

In Step 803, sigma-delta calculation is performed by using the $C_{block\_base}$ value of the $(K+n)^{th}$ frame, and the client signal is mapped to corresponding sub-blocks of the payload area of the $(K+n)^{th}$ frame.

The sigma-delta calculation is performed by using the acquired block number of the client signal to be borne by the $(K+n)^{th}$ frame, so a position distribution of the client signal in the block region can be determined, and a part or all of the client signal to be borne by the $(K+n)^{th}$ frame can be uniformly mapped to corresponding sub-blocks of the OPUk block region of the $(K+n)^{th}$ frame with an N-byte granularity.

Similarly, in the framing process, when a row/column counter indicates that rows/columns processed in a current clock cycle are located or partially located at the OPUk block region, an adder/comparator performs sigma-delta calculation, and determines whether a sub-block corresponding to the rows/columns processed in the current clock cycle is a sub-block to which the client signal is mapped, and if yes, uses the sub-block as a client signal sub-block and maps the client signal; otherwise, uses the block as a stuff sub-block.

For example, it is assumed that the processing bit width of the processor is 16*8=128 bits, the OPUk block region of the $(K+n)^{th}$ frame is 15228 bytes, the adjustment region is 5 bytes, the size of the logically divided sub-blocks of the OPUk block region of the (K+n)$^{th}$ frame is N=4 bytes, and the entire OPUk block region is divided into M=3807 sub-blocks. When the row/column counter indicates that the rows/columns processed in the current clock cycle are located in the OPUk block region, only a 12-bit adder/comparator needs to be selected to perform sigma-delta calculation by using a decision granularity of a block for 4 times, so as to complete mapping of 4 sub-blocks (4*4 bytes). If a decision granularity of a byte is used, a 14-bit adder/comparator needs to be selected to perform sigma-delta calculation for 16 times so as to complete mapping of 16 bytes. The OPUk adjustment region bears $C_{delta}$ bytes of the client signal, and $C_{delta}$ bytes of the client signal may be mapped to the adjustment region according to an agreed rule, for example, from left to right or from right to left.

Optionally, several position distribution relations of stuff sub-blocks (sub-blocks for bearing a stuff signal) and client signal sub-blocks (sub-blocks for bearing the client signal) in the OPUk block region may also be preset corresponding to the sub-block size of each type of logical division of the OPUk block region, and each position distribution relation is corresponding to the block number of the client signal borne by the OPUk block region, so that when the client signal is mapped, the client signal can be fixedly mapped to the client signal sub-blocks of the OPUk block region directly according to the preset position distribution relations.

The mapping of the client signal through presetting of the position distribution of stuff sub-blocks and client signal sub-blocks can greatly reduce the decision and calculation process, and simplify the mapping process, thereby achieving flexible processing.

Further, the (K+n)$^{th}$ frame is sent after the OH area information of the (K+n)$^{th}$ frame is generated.

Correspondingly, in an embodiment, the present invention further provides a method for demapping a client signal.

Figure 9:
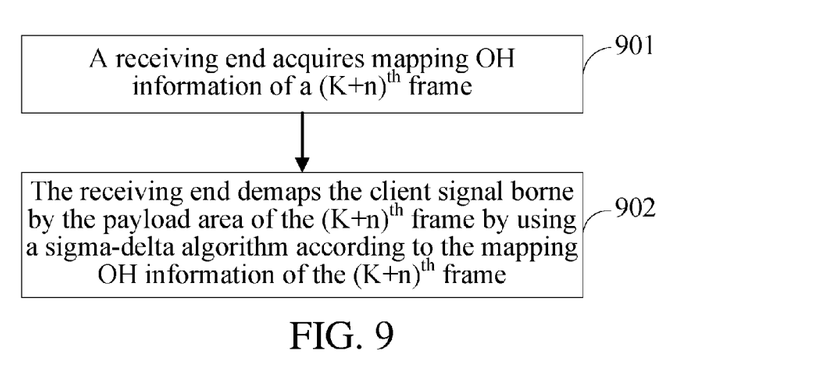
FIG. 9 is a flow chart of a method for demapping a client signal according to the third embodiment of the present invention.

Referring to FIG. 9, a method for demapping a client signal according to the third embodiment of the present invention specifically includes the following steps.

In Step 901, a receiving end acquires mapping OH information of a (K+n)$^{th}$ frame.

The receiving end can acquire the mapping OH information of the (K+n)$^{th}$ frame by demapping an OPUk OH area of a K$^{th}$ frame. The acquired mapping OH information includes, but is not limited to, indication information of a block number of a client signal borne by a block region, a size of logically divided sub-blocks of the block region, a size of an adjustment region, a byte number of the client signal borne by the adjustment region, a mapping manner and the like.

In Step 902, the receiving end demaps the client signal borne by the payload area of the (K+n)$^{th}$ frame by using a sigma-delta algorithm according to the mapping OH information of the (K+n)$^{th}$ frame.

Correspondingly, the receiving end may determine a mapping manner of the (K+n)$^{th}$ frame, the size of the logically divided sub-blocks of the block region, the block number of the client signal borne by the block region, the size of the adjustment region, and the byte number of the client signal borne by the adjustment region according to the mapping OH information. The receiving end can determine a position distribution of the client signal in the payload area by using a sigma-delta algorithm according to the above information, and thus can demap the client signal of the payload area to recover the client signal according to the determined position distribution.

It can be seen that, in this embodiment, the OPUk payload area is logically divided into sub-blocks flexibly, and when the client signal is mapped, block mapping of the client signal is performed by using a mapping decision granularity of a block, so that the mapping process of the client signal is simplified, thereby meeting requirements of multi-rate services.

Further, the OPUk payload area may be divided into a block region and an adjustment region, and the OPUk block region is flexibly divided into blocks, so that both block mapping and byte mapping can be performed, thereby achieving higher service adaptability, more flexible mapping process, and more diversified solutions.

It should be understood that, the mapping and demapping methods and devices described in the above embodiments are also suitable for mapping an ODUj client signal to a payload area of Optical channel Data Tributary Unit j to k (ODTUjk) and demapping the ODUj client signal from the payload area of the ODTUjk.

For example, when an ODU2 signal is mapped to an ODTU24, a block size of 8 bytes can be selected for mapping.

Fourth Embodiment

Figure 10:
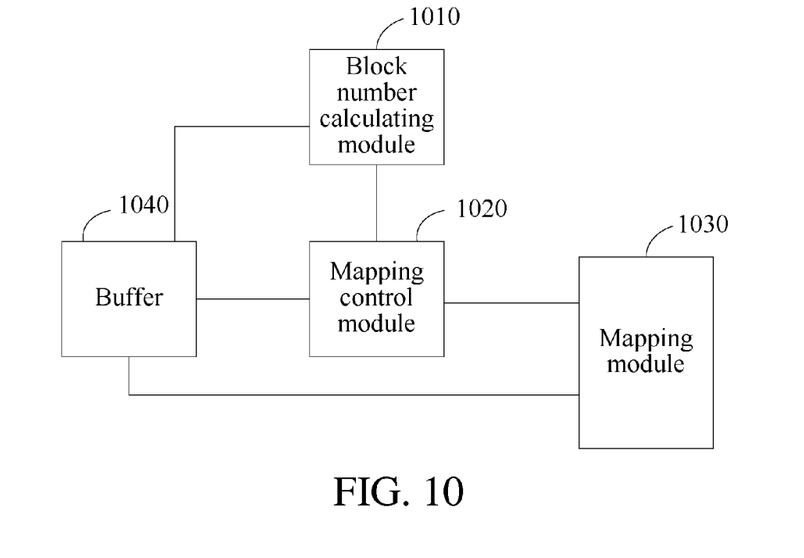
FIG. 10 is a schematic view of a device for mapping a client signal according to a fourth embodiment of the present invention.

Correspondingly, in an embodiment, the present invention further provides a device for mapping a client signal. Referring to FIG. 10, a device for mapping a client signal according to a fourth embodiment of the present invention includes a block number calculating module 1010, a mapping control module 1020, and a mapping module 1030.

The block number calculating module 1010 is configured to calculate a block number of a client signal to be transported according to a sub-block size of a payload area of an OPU or ODTU, in which the payload area includes several sub-blocks having a size of N bytes, and N is greater than or equal to 1.

The mapping control module 1020 is configured to generate a control signal according to the block number of the client signal, in which the control signal is configured to indicate a position distribution of the client signal to be transported in sub-blocks of the payload area.

The mapping module 1030 is configured to map the client signal, to be transported, in a buffer 1040 to corresponding sub-blocks of the payload area according to the control signal generated by the mapping control module 1020.

In an application scenario, the mapping control module 1020 is specifically configured to perform sigma-delta calculation according to the block number calculated by the block number calculating module 1010 to generate a control signal, and the control signal is configured to indicate the position distribution of the client signal to be transported in the sub-blocks of the payload area.

The mapping module 1030 reads client data from the buffer 1040 with an N-byte granularity according to the indication of a row/column counter with regard to rows/columns processed in a current clock cycle and under the control of the control signal, and maps the client data to the corresponding sub-blocks of the payload area.

In an application scenario, the mapping control module 1020 is further configured to generate mapping OH information, and the mapping OH information includes indication information of the block number of the client signal to be transported.

In an application scenario, the mapping module 1030 is further configured to map the mapping OH information to an OH area of the OPU or ODTU.

If the payload area includes an adjustment region and a block region, and the block region includes several sub-blocks having a size of N bytes, the mapping module 1030 is further configured to map several bytes of the client signal in the buffer to the adjustment region.

It should be understood that, the functions of the functional modules of the device according to this embodiment may be specifically implemented according to the method in the second or third embodiment, and for the specific implementation process, reference can be made to the relevant description in the second or third embodiment, and the details will not be described herein again.

Fifth Embodiment

Figure 11:
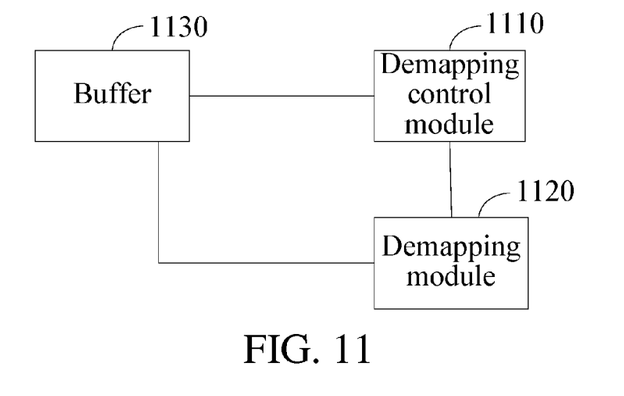
FIG. 11 is a schematic view of a device for demapping a client signal according to a fifth embodiment of the present invention.

Correspondingly, in an embodiment, the present invention further provides a device for demapping a client signal. Referring to FIG. 11, a device for demapping a client signal according to a fifth embodiment of the present invention includes a demapping control module 1110 and a demapping module 1120.

The demapping control module 1110 is configured to acquire a block number of a client signal borne by a payload area of an OPU or ODTU, and generate a control signal according to the block number, in which the control signal is configured to indicate a position distribution of the client signal in sub-blocks of the payload area, the payload area includes several blocks having a size of N bytes, and N is greater than or equal to 1.

The demapping module 1120 is configured to demap the client signal borne by the payload area according to the control signal generated by the demapping control module 1110.

In an application scenario, the demapping module 1120 demaps the client signal borne by the corresponding sub-blocks of the payload area from a buffer 1130 with an N-byte granularity according to the indication of a row/column counter with regard to rows/columns processed in a current clock cycle and under the control of the control signal.

It should be understood that, the functions of the functional modules of the device according to this embodiment may be specifically implemented according to the method in the second or third embodiment, and for the specific implementation process, reference can be made to the relevant description in the second or third embodiment, and the details will not be described herein again.

It should be noted that, the above method embodiments are expressed as a series of operations for ease of description; however, it should be known to persons skilled in the art that the present invention is not limited to the sequence of the operations described, because some steps may be performed in other sequences or concurrently according to the present invention. Furthermore, it should also be known to persons skilled in the art that all the embodiments described in the specification are preferred embodiments, and the operations and modules involved may not be necessary for the present invention.

In the above embodiments, the descriptions of the embodiments place different emphasis on different aspects, and for a part that is not detailed in an embodiment, reference can be made to the relevant descriptions of other embodiments.

Based on the above, in the technical solutions adopted by the embodiments of the present invention, the OPUk/ODTUjk payload area is logically divided into blocks flexibly, and when the client signal is mapped, block mapping of the client signal is performed by using a mapping decision granularity of a block, so that the mapping process of the client signal is simplified, thereby meeting requirements of multi-rate services.

Further, the OPUk/ODTUjk payload area may be divided into a block region and an adjustment region, and the OPUk/ODTUjk block region is flexibly divided into blocks, so that both block mapping and byte mapping can be performed, thereby achieving higher service adaptability, more flexible mapping process, and more diversified solutions.

Person having ordinary skill in the art may understand that all or part of the steps of the method according to the embodiments of the present invention may be implemented by a program instructing relevant hardware. The program may be stored in a computer readable storage medium. The storage medium may be a magnetic disk, a Compact Disk Read-Only Memory (CD-ROM), a Read-Only Memory (ROM), or a Random Access Memory (RAM).

A method and a device for mapping and demapping a client signal provided by the present invention are introduced in detail above, the principle and implementation of the present invention are described herein through specific embodiments, and the description of the embodiments are merely intended to make the method and core idea of the present invention comprehensible. Person having ordinary skill in the art can make variations and modifications to the present invention in terms of the specific implementations and application scopes according to the ideas of the present invention. Therefore, the specification shall not be construed as limitations to the present invention.

What is claimed is:

1. A method for mapping a client signal, comprising:
dividing a part or all of a payload area of an Optical Channel Payload Unit (OPU) into several sub-blocks, wherein each of the sub-blocks has a size of N bytes, and N is an integer greater than 1;
calculating, by a processor, a block number of the client signal to be transported according to the sub-block size of the payload area;
generating mapping overhead (OH) information which comprises indication information of the block number of the client signal to be transported, and mapping the mapping OH information to an OH area of Optical Transport Network (OTN) frame, wherein the indication information of the block number of the client signal to be transported comprises a bit reversal field and an increment/decrement indication field, and the bit reversal field and the increment/decrement indication field jointly indicate the block number of the client signal through bit reversal;
determining a position distribution of the client signal to be transported in the sub-blocks of the payload area by using the block number; and
mapping the client signal to be transported to corresponding sub-blocks of the payload area with an N-byte granularity according to the determined position distribution.

2. The method for mapping a client signal according to claim 1, wherein determining the position distribution of the client signal to be transported in the sub-blocks of the payload area by using the block number comprises: determining the position distribution of the client signal to be transported in the sub-blocks of the payload area by performing a sigma-delta algorithm according to the block number.

3. The method for mapping client signals according to claim 2, wherein determining the position distribution of the client signal to be transported in the sub-blocks of the payload area by performing a sigma-delta algorithm according to the block number comprises:
if $(i \times C_{block}) \bmod M < C_{block}$, the $i^{th}$ sub-block of the payload area is a client signal sub-block; and
if $(i \times C_{block}) \bmod M \geq C_{block}$, the $i^{th}$ sub-block of the payload area is a stuff sub-block, in which $C_{block}$ is the block number of the client signal, and M is the total number of the divided sub-blocks of the OPU payload area.

4. The method for mapping a client signal according to claim 3, wherein determining the position distribution of the client signal to be transported in the sub-blocks of the payload area by using the block number comprises: obtaining a preset position distribution of sub-blocks for bearing a stuff signal and sub-blocks for bearing the client signal in the payload area corresponding to the block number according to the block number.

5. The method for mapping a client signal according to claim 1, wherein the payload area comprises an adjustment region and a block region, wherein the block region of the payload area is divided into several sub-blocks having a size of N bytes, and wherein the method further comprises: mapping several bytes of the client signal to be transported to the adjustment region of the payload area.

6. The method for mapping a client signal according to claim 5, wherein the mapping OH information further comprises: indication information of a byte number of the client signal borne by the adjustment region.

7. A method for mapping a client signal, comprising:
dividing a part or all of a payload area of an Optical Channel Payload Unit (OPU) into several sub-blocks, wherein each of the sub-blocks has a size of N bytes, and N is an integer greater than 1;
calculating, by a processor, a block number of the client signal to be transported according to the sub-block size of the payload area;
determining a position distribution of the client signal to be transported in the sub-blocks of the payload area by using the block number; and
mapping the client signal to be transported to corresponding sub-blocks of the payload area with an N-byte granularity according to the determined position distribution.

8. The method for mapping client signals according to claim 7, wherein determining the position distribution of the client signal to be transported in the sub-blocks of the payload area by using the block number comprises: determining the position distribution of the client signal to be transported in the sub-blocks of the payload area by performing a sigma-delta algorithm according to the block number.

9. The method for mapping client signals according to 8, wherein determining the position distribution of the client signal to be transported in the sub-blocks of the payload area by performing a sigma-delta algorithm according to the block number comprises:
if $(i \times C_{block}) \mod M < C_{block}$, the $i^{th}$ sub-block of the payload area is a client signal sub-block; and
if $(i \times C_{block}) \mod M \geq C_{block}$, the $i^{th}$ sub-block of the payload area is a stuff sub-block, in which $C_{block}$ is the block number of the client signal, and M is the total number of the divided sub-blocks of the OPU payload area.

10. The method for mapping client signals according to claim 7, wherein determining the position distribution of the client signal to be transported in the sub-blocks of the payload area by using the block number comprises: obtaining a preset position distribution of sub-blocks for bearing a stuff signal and sub-blocks for bearing the client signal in the payload area corresponding to the block number according to the block number.

11. The method for mapping client signals according to claim 7, wherein the payload area comprises an adjustment region and a block region, wherein the block region of the payload area is divided into several sub-blocks having a size of N bytes, and wherein the method further comprises: mapping several bytes of the client signal to be transported to the adjustment region of the payload area.

12. The method for mapping client signals according to claim 11, further comprising: generating mapping overhead (OH) information which comprises indication information of a byte number of the client signal borne by the adjustment region, and mapping the mapping OH information to an OH area.

13. A device for mapping a client signal, comprising:
a block number calculating module, configured to calculate a block number of a client signal to be transported according to a sub-block size of a payload area of an Optical Channel Payload Unit (OPU), wherein the payload area comprises several sub-blocks having a size of N bytes, and N is greater than 1;
a mapping control module, configured to generate a control signal according to the block number of the client signal, wherein the control signal is configured to indicate a position distribution of the client signal to be transported in the sub-blocks of the payload area; and
a mapping module, configured to map the client signal, to be transported, in a buffer to corresponding sub-blocks of the payload area with an N-byte granularity according to the control signal.

14. The device for mapping a client signal according to claim 13, wherein the mapping control module is specifically configured to perform sigma-delta calculation according to the block number of the client signal to generate a control signal, and the control signal is configured to indicate the position distribution of the client signal to be transported in the sub-blocks of the payload area.

15. The device for mapping a client signal according to claim 14, wherein the mapping control module is further configured to generate mapping overhead (OH) information, and the mapping OH information comprises indication information of the block number of the client signal to be transported; and wherein the mapping module is further configured to map the mapping OH information to an OH area.

16. The device for mapping a client signal according to claim 13, wherein the payload area comprises an adjustment region and a block region, and the block region comprises several sub-blocks having a size of N bytes; and wherein the mapping module is further configured to map several bytes of the client signal in the buffer to the adjustment region of the payload area.

* * * * *